United States Patent Office — 3,057,916 — Patented Oct. 9, 1962

3,057,916
PROCESS FOR PREPARING TRICHLOROACETIC ACID
Kurt Sennewald, Knapsack, near Cologne, Arthur Wolfram, Frankfurt am Main, Hans Kolb and Theodor Sievers, Gersthofen, near Augsburg, Germany, and Hans Hoyer, Hartsdale, N.Y., assignors to Knapsack-Griesheim Aktiengesellschaft, Knapsack, near Cologne, Germany, a corporation of Germany
No Drawing. Filed Nov. 8, 1957, Ser. No. 695,204
7 Claims. (Cl. 260—539)

The present invention relates to a process for the preparation of trichloroacetic acid by chlorination of acetic acid, monochloroacetic acid, dichloroacetic acid and mixtures thereof.

When chlorinating acetic acid to form monochloroacetic acid, which reaction is carried out on an industrial scale, there are always obtained as by-products, independent of the catalyst, small amounts of higher chlorinated acetic acids such as dichloroacetic acid and also trichloroacetic acid. The most favorable industrial utilization of said by-products consists in further chlorinating them to obtain trichloroacetic acid which is suitable for many applications.

The further chlorination of the mother liquors is generally carried out under atmospheric pressure and it takes place at a somewhat useful rate only at temperatures of about 140° C. In the course of the chlorination strong decomposition phenomena always occur, especially towards the end of the reaction, which largely impair the yield of the desired trichloroacetic acid. There are formed hydrogen chloride, di- or trichloroacetic acid chloride, carbon monoxide, carbon dioxide and phosgene.

Experiments have proved that the decompositions are mainly caused by the presence of metal chlorides. On the one hand the metal chlorides promote the chlorination, on the other hand, however, they cause the catalytic decomposition of the chloroacetic acids concurrently with the catalytic acceleration of the reaction.

The following reactions take place side by side—
I. Chlorination:
 (a) $CH_2ClCOOH + Cl_2 (FeCl_3)$ 
 $\longrightarrow CHCl_2COOH + HCl$
 (b) $CHCl_2COOH + Cl_2 (FeCl_3)$ 
 $\longrightarrow CCl_3COOH + HCl$ II. Decomposition:
 (a) 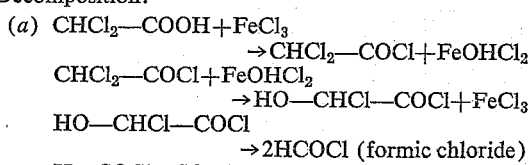
 $CHCl_2\text{—}COOH + FeCl_3$
  $\rightarrow CHCl_2\text{—}COCl + FeOHCl_2$
 $CHCl_2\text{—}COCl + FeOHCl_2$
  $\rightarrow HO\text{—}CHCl\text{—}COCl + FeCl_3$
 $HO\text{—}CHCl\text{—}COCl$
  $\rightarrow 2HCOCl$ (formic chloride)
 $H\text{—}COCl \rightarrow CO + HCl$
 (b) 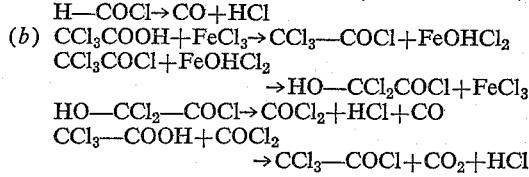
 $CCl_3COOH + FeCl_3 \rightarrow CCl_3\text{—}COCl + FeOHCl_2$
 $CCl_3COCl + FeOHCl_2$
  $\rightarrow HO\text{—}CCl_2COCl + FeCl_3$
 $HO\text{—}CCl_2\text{—}COCl \rightarrow COCl_2 + HCl + CO$
 $CCl_3\text{—}COOH + COCl_2$
  $\rightarrow CCl_3\text{—}COCl + CO_2 + HCl$ It was possible to detect in the experiments carried out in order to study the decomposition phenomena all by-products formed according to the foregoing equations, such as hydrogen chloride, di- or trichloroacetic acid chloride, carbon monoxide, carbon dioxide and phosgene. Only the formic chloride could not be detected owing to its instability; it decomposes at once to form carbon monoxide and hydrogen chloride. This fact could be ascertained by the formation of large amounts of CO.

In the preparation of trichloroacetic acid by chlorination of mother liquors the decomposition reaction increases continuously as the concentration of trichloroacetic acid becomes increased by the progressive chlorinating reaction since tricloroacetic acid is considerably more unstable in the presence of metal chlorides than dichloroacetic acid; trichloroacetic acid therefore decomposes at distinctly lower temperatures than dichloroacetic acid. In case trichloroacetic acid is heated, for example, for 3½ hours at about 140° C. in the presence of 1% of $FeCl_3$, 31% of the substance used decomposes, whereas dichloroacetic acid exhibits under the same conditions only traces of decomposition.

It results from the experiments carried out that it is necessary to eliminate the metal chlorides in order to obtain practically quantitative yields of trichloroacetic acid. For the elimination of the metal chlorides, various methods have been proposed.

It is possible, for example, to separate the mother liquor from the metal chlorides by distillation or to concentrate the metal chlorides in the residue by freezing. It is likewise possible to eliminate the disturbing metal chlorides by other physical methods, for example by way of electrolysis, or by chemical processes such as reactions or precipitation.

The following results of experiment characterize the situation.

A distilled mother liquor yields when chlorinated at 140° C.

(1) with a content of 0.00% of metal chloride in 374 hours, $CCl_3\text{—}COOH$ of 96.9% strength in a yield of 97.5%;
 (2) with a content of 0.25% by weight of $FeCl_3$ in 34 hours, $CCl_3\text{—}COOH$ of 85.8% strength in a yield of 66.0%;
 (3) with a content of 1.00% by weight of $SbCl_5$ in 32 hours, $CCl_3\text{—}COOH$ of 52.5% strength in a yield of 25.0%.

It results from the above values that when a mother liquor is chlorinated which is freed from metal chlorides highly concentrated trichloroacetic acid is obtained in a practically theoretical yield, however, only after a relatively prolonged reaction period. In the presence of metal chlorides, the chlorine is rapidly absorbed but in no case highly concentrated trichloroacetic acid is obtained and very high losses in yield are involved since the trichloroacetic acid decomposes more rapidly than it is formed.

It is an object of this invention to eliminate in the preparation of trichloroacetic acid by chlorination of acetic acid, monochloroacetic acid, dichloroacetic acid or mixtures thereof, the metal chlorides contained therein, and to continue the chlorination of the reaction mixture. As mixtures of the above mentioned substances there may be used, for example, mother liquors obtained in the chlorination of acetic acid to form monochloroacetic acid in the presence or absence of catalysts. The use of mother liquors of this kind is even preferable. The chlorides are eliminated at the latest when decompositions occur. This is generally the case when the solidification point which is dependent on the trichloroacetic acid is about 25–35° C. or above. A practically quantitative yield of trichloroacetic acid having a high degree of purity can only be obtained when the metal chlorides are eliminated from the starting material according to the invention.

The metal chlorides can be separated, for example, by distilling off the starting materials, for example the mother liquors and the distillate can then be further chlorinated. The distillation is advantageously carried out under reduced pressure, for example between about 25 and 500 mm. of mercury according to methods which are usual in industry.

Another way to counteract the decomposing action of the metal chlorides in the process according to the invention consists in adding to the reaction mixture sulfuric acid and/or phosphoric acid in an amount which is at least sufficient to bind the metal ions present in the mixture. Prior to the further chlorination to form trichloroacetic acid the precipitated salts can be separated in known manner, for example by filtration, centrifugation, decantation, clarification etc.

It is furthermore advantageous to use for the separation of the metal chlorides as well as for the subsequent chlorination of the reactants which are freed from the metal chlorides, for example, the mother liquor, apparatus, conduits, packings, sealings and the like which are completely free of iron. It is also necessary to liberate the chlorine used for the chlorination from the ferric chloride contained therein. It is known that industrially prepared chlorine which is always stored in iron devices or containers permanently contains small amounts of iron chloride. The chlorine is advantageously purified by means of concentrated sulfuric acid converting the iron chloride into the non-volatile iron sulfate which remains in the sulfuric acid used for the washing process, while the chlorine leaving the washing tower is free of iron. When carrying out the chlorination process according to the invention, there may be used devices of enamel, glass, porcelain and the like. It is also possible to use vessels lined with an acid-proof material. Members of the apparatus which do not come into contact with the chlorine, for example, the distilling vessel and the heating device thereof, may be made of graphitized carbon or silver. It is also necessary carefully to avoid the presence of rubber in the distilling and chlorination device, in the conduits, measuring pipes and packings since it influences in a similarly unfavorable manner the yield of trichloroacetic acid.

In case, however, an excess of sulfuric and/or phosphoric acid is added to the reaction mixture, impurities of iron and/or copper originating from the apparatus can be also neutralized in the reaction mixture. In this case, the separation of the salts prior to the further chlorination and the preliminary purification of the chlorine may be dispensed with.

It is likewise known and has been confirmed again that when preparing trichloroacetic acid by chlorination of acetic acid, mono- or dichloroacetic acid or mixtures thereof, as obtained for example in the mother liquors of purified monochloroacetic acid, long chlorination periods and higher temperatures are required. Losses in yield could hitherto not be avoided due to the occurring decompositions. Said decompositions are favored, as already described above, by dissolved iron compounds which may be present in the starting material in the form of impurities, also contaminating and discoloring in an undesired manner the final product.

An especially advantageous variant of the process according to the invention consists in carrying out the chlorination of the starting materials mentioned to form trichloroacetic acid at first in the presence of iron and/or copper compounds, preferably in dissolved form, and then to reduce or counteract the catalytic action of the metals at the latest when decompositions occur, i.e. generally when the solidification temperature which depends on the trichloroacetic acid content is 25–35° C. or higher. This counteraction is effected by adding sulfuric acid and/or phosphoric acid in an amount which is sufficient to bind the metal ions present. In this case, the separation of the iron and/or copper salts may be dispensed with.

According to a further feature of the present invention, sulfuric or phosphoric acid or mixtures thereof are added to the starting materials either straight away or during the chlorination process. In case only copper is present, said inactivation is automatically caused by the hydrogen chloride formed in the course of the reaction.

With progressive chlorination, the mineral acids mentioned above cause an increasing separation of the metals in the form of their salts, having in suspension only a feeble catalytic action as compared with the dissolved metal compounds. It is therefore possible to free the chlorination mixture, prior to the working up, in a simple manner from the separations, for example by decantation and clarification. Also, when carrying out the process according to the invention with larger quantities of iron and/or copper, there remains at the end of the chlorination only a very small fraction of them in dissolved state so that an undesired contamination or discoloration of the trichloroacetic acid or the products resulting therefrom is avoided. In case the mineral acid is subsequently added, namely during the chlorination, whereby the accelerating action of the iron and/or copper compounds on the chlorination of the starting materials to form trichloroacetic acid is maintained for a more prolonged time, said addition takes place at the latest when chlorides of the chloroacetic acids appear.

The process according to the invention is well suitable for mother liquors of chloroacetic acids, as obtained, for example, in considerable amounts in the purification of crude monochloroacetic acid and which contain in most cases iron and/or copper compounds.

The process according to the invention is also suitable for the starting materials mentioned in case they contain water and/or chlorine-containing organic compounds such as chlorohydrocarbons or chlorine- and oxyen-containing organic compounds in an amount of several percent.

It is generally advantageous to carry out the process according to the invention at definite minimum temperatures of above about 85–90° C., preferably from +130° C.–160° C. or higher in order to attain a good effect. Furthermore, the chlorination can be carried out under atmospheric pressure, elevated or slightly reduced pressure. It is preferable, however, to operate under normal or elevated pressure, for example, the saturation pressure of chlorine at the temperature applied.

The following examples serve to illustrate the invention but they are not intended to limit it thereto.

*Example 1*

(a) According to the hitherto known method of working, 1 kg. of commercial mother liquor of the following composition: 67.0% by weight of monochloroacetic acid, 22.3% by weight of dichloroacetic acid, 2.8% by weight of trichloroacetic acid, 4.0% by weight of acetic acid, 2.0% by weight of water and 0.4% by weight of ferric chloride was chlorinated at 140° C. without further pre-treatment in a glass apparatus provided with a reflux condenser. The chlorination was terminated after 27.5 hours and the yield of trichloroacetic acid obtained in the subsequent working up amounted to 51% calculated on the mother liquor used.

(b) In contradistinction to Example 1a a further test was carried out as follows:

1 kg. of commercial mother liquor composed of 67.2% by weight of monochloroacetic acid, 22.4% by weight of dichloroacetic acid, 2.8% by weight of trichloroacetic acid, 4.0% by weight of acetic acid, 2.0% by weight of water and 0.05% by weight of ferric chloride was chlorinated at 140° C. without further pre-treatment in a glass apparatus provided with a reflux condenser. The chlorination was terminated after 52 hours and the yield of trichloroacetic acid amounted to 80.5% calculated on the mother liquor used.

(c) According to the process of the invention, the chlorination was carried out as follows:

1 kg. of the commercial mother liquor used in Example 1a was distilled under reduced pressure (100 mm. of mercury) and subsequently chlorinated at 140° C. in a glass apparatus provided with a reflux condenser. The distilling as well as the chlorination apparatus had no connecting tubes made of rubber and the chlorine required for the chlorination had previously been washed with concentrated sulfuric acid in a gas washing bottle made of glass.

The chlorination was terminated after 374 hours. 97.5% of trichloroacetic acid were obtained calculated on the mother liquor used. The acid had a degree of purity of 96.9%.

Example 2

1,000 kg. of commercial mother liquor of the following composition: 67.0% by weight of monochloroacetic acid, 22.3% by weight of dichloroacetic acid, 2.8% by weight of trichloroacetic acid, 4.0% by weight of acetic acid, 2.0% by weight of water and 0.4% by weight of ferric chloride were distilled under reduced pressure (100 mm. of mercury) in a semi-industrial apparatus. The vessel of said apparatus was lined with an acid-proof material and provided with a heating coil of silver. Above the vessel there was installed a tower of 2 m. height lined with an acid-proof material and charged with acid-proof filling bodies. The tower was connected with a condenser lined with silver.

The distillate obtained in said apparatus (976 kg.) was subsequently chlorinated at 140° C. in a vessel lined with an acid-proof material and provided with a reflux condenser made of an acid-proof, heat and corrosion resistant material; the vessel was also provided with a heating device of silver also applicable for cooling. The material of the reflux condenser consisting of porous graphite was made tight to liquids by impregnation with a synthetic resin of phenol and formaldehyde. The chlorine used for the chlorination had been previously washed in a countercurrent with concentrated sulfuric acid in a washing tower lined with an acid-proof material and charged with acid-proof filling bodies and thus freed of the iron chloride.

The chlorination was terminated after 320 hours. The yield of trichloroacetic acid amounted to 98% and the acid had a degree of purity of 97.5%.

Example 3

(a) 900 parts by weight of a mixture of 14% by weight of acetic acid, 51% by weight of monochloroacetic acid, 33% by weight of dichloroacetic acid and 1% by weight of trichloroacetic acid, which mixture was completely free of dissolved or suspended heavy metal compounds, were treated at 140° C. with dry gaseous chlorine until the solidification point of the final product was 55.4° C. The chlorination was terminated after 177 hours and 1395 parts by weight of trichloroacetic acid were obtained corresponding to a theoretical yield of 93.7%.

(b) Another test was carried out as follows:

The same amount of a mother liquor of chloroacetic acids having a similar composition as described above but containing additionally 180 mg. of iron per kg. of mother liquor was chlorinated at 140° C. The chlorination had to be interrupted after 94 hours on account of the strong decomposition phenomena. There were obtained 862 parts by weight of a product solidifying at 31° C. and having a high content of di- and trichloroacetyl chlorides. After having cooled and separated there were obtained 434 parts by weight of trichloroacetic acid corresponding to only 28.5% of the theory. The acid had a solidification point of 55.8° C. This method of working proved to be absolutely unsuitable.

(c) A further test gave the following result:

900 parts by weight of the same mother liquor of chloroacetic acids again containing 180 mg. of iron per kg. of mother liquor were chlorinated at 140° C. after the addition of 9 parts by weight of concentrated sulfuric acid. After 137 hours the reaction product had a solidification point of 55.2° C. The yield amounted to 1300 parts by weight of trichloroacetic acid corresponding to 91% of the theory. Consequently the chlorination was terminated after 77% of the time required in Example 3a without addition of iron and sulfuric acid. The hot filtered final product was practically free of iron.

Example 4

900 parts by weight of a mixture consisting of 15% by weight of acetic acid, 48.5% by weight of monochloroacetic acid, 34.5% by weight of dichloroacetic acid and 2% by weight of water were treated at 140° C. after addition of 26 parts by weight of anhydrous ferric chloride and 45 parts by weight of concentrated sulfuric acid with the same amount of chlorine per unit of time. (Ex. 3). The chlorination was terminated after 107 hours. The yield amounted to 1290 parts by weight of trichloroacetic acid (corresponding to 92% of the theory) having a solidification point of 55° C. During the chlorination process large amounts of iron sulfate separated from the mixture. After having been clarified, the hot reaction product contained less than 5 mg. of iron per kg.

Example 5

900 parts by weight of a mother liquor of chloroacetic acids having the same composition as described in Example 3 but containing 400 mg. of iron per kg. of mother liquor were treated at 140° C. with the same amount of chlorine per unit of time as in Example 3. After a chlorination period of 50 hours 9 parts by weight of sulfuric acid were added. At that moment the reaction mixture contained about 3% by weight of di- and trichloroacetyl chloride and had a solidification point of 37° C. The chlorination was terminated after a further 35 hours and 1150 parts by weight of trichloroacetic acid were obtained solidifying at 56.3° C. and containing per kg. about 5–10 mg. of iron. Consequently the chlorination was terminated after 48% of the time required in Example 3a.

Example 6

1200 parts by weight of a mother liquor of chloroacetic acids containing per kg. 200 mg. of iron were chlorinated at 140° C. after addition of 12 parts by weight of phosphoric acid of 100% strength until a solidification point of 55.2° C. was attained. After the deposition of the white precipitate of iron phosphate the hot final product (1780 parts by weight corresponding to 95.4% of the theory) only contained traces of iron. The chlorination run for 152 hours.

Example 7

900 parts by weight of a mixture of acetic acid and the three chloroacetic acids according to Example 3 but without addition of iron were chlorinated at 140° C. under the same conditions as in Example 3 after addition of 0.2 part by weight of cupric chloride until the reaction mixture had a solidification point of 55.1° C. 1395 parts by weight of trichloroacetic acid were obtained corresponding to a yield of 90.3%. In the course of the chlorination no signs of decomposition could be detected. At the end of the process practically all copper had separated in the form of cuprous chloride. The chlorination process was terminated after 93.5 hours i.e. after scarcely 53% of the time required in Example 3a.

We claim:

1. In the process for the manufacture of trichloroacetic acid by chlorinating with gaseous chlorine a substance selected from the group consisting of acetic acid, monochloroacetic acid, dichloroacetic acid and mixtures thereof at a temperature above about 85° C. in the liquid state and in the presence of dissolved metal salts selected from the group consisting of iron salts, copper salts and mixtures thereof, the improvement which consists of distilling a partially chlorinated reaction mixture consisting substantially of partially chlorinated acetic acids and containing a substantial amount of dichloroacetic acid to separate from said partial chlorinated acetic acids the metal salt contained therein, and further chlorinating the distillate by means of gaseous chlorine to yield substantially pure trichloroacetic acid.

2. A process as defined in claim 1 wherein the distillation is carried out under a pressure between 25 and 500 mm. of mercury.

3. In the process for the manufacture of trichloroacetic acid by chlorinating with gaseous chlorine a substance selected from the group consisting of acetic acid, monochloroacetic acid, dichloroacetic acid and mixtures thereof at a temperature above about 85° C. in the liquid state and in the presence of a dissolved metal salt selected from the group consisting of iron salts, copper salts and mixtures thereof, which compounds act upon the trichloroacetic acid formed to decompose said acid, the improvement which consists in adding sulfuric acid in an amount which is at least sufficient to bind the metal ions present in the starting material at a time between the point when a substantial amount of dichloroacetic acid is present and the point at which initial decomposition of the trichloroacetic acid occurs to produce a substance which is to be further chlorinated and in which the acetic acids are present in the free form to forestall decomposing action of the said metal salts upon the trichloroacetic subsequently formed, and further chlorinating by the action of gaseous chlorine the aforesaid substance to be chlorinated to yield substantially pure trichloroacetic acid.

4. A process as defined in claim 3 wherein a mixture comprising monochloro- and dichloroacetic acid is used as starting material.

5. A process according to claim 3, wherein the last chlorination step is carried out at a temperature in the range from about 130 to about 160° C.

6. In the process for the manufacture of trichloroacetic acid by chlorinating with gaseous chlorine a substance selected from the group consisting of acetic acid, monochloroacetic acid, dichloroacetic acid and mixtures thereof at a temperature above about 85° C. in the liquid state and in the presence of a dissolved metal salt selected from the group consisting of iron salts, copper salts and mixtures thereof the improvement which consists in adding sulphuric acid in an amount which is at least sufficient to bind the metal ions present in the starting material, at a time between the point when a substantial amount of dichloroacetic acid is present and the point at which initial decomposition of the trichloroacetic acid occurs to precipitate the metal salts, thereby to forestall the decomposing action of the metal salts upon the trichloroacetic acid subsequently formed, then further chlorinating the substance to be chlorinated by means of gaseous chlorine, and separating the precipitated metal salts from the substantially pure trichloroacetic acid thus formed.

7. In the process for the manufacture of trichloroacetic acid by chlorinating with gaseous chlorine a substance containing water and being selected from the group consisting of acetic acid, monochloroacetic acid, dichloroacetic acid and mixtures thereof at a temperature above about 85° C. in the liquid state and in the presence of a dissolved metal salt selected from the group consisting of iron salts, copper salts and mixtures thereof the improvement which consists of adding a compound selected from the group consisting of phosphoric acid and sulphuric acid in an amount which is at least sufficient to bind the metal ions present in the starting material, at a time between the point when a substantial amount of dichloroacetic acid is present and the point at which initial decomposition of the trichloroacetic acid occurs to precipitate the metal salts, thereby to forestall the decomposing action of the metal salts upon the trichloroacetic acid subsequently formed, then further chlorinating the substance to be chlorinated by means of gaseous chlorine, and additionally separating the precipitated metal salts from the substantially pure trichloroacetic acid thus formed.

References Cited in the file of this patent

UNITED STATES PATENTS

| | | |
|---|---|---|
| 1,757,100 | Strosacker | May 6, 1930 |
| 1,993,713 | Bass et al. | Mar. 5, 1935 |
| 2,168,260 | Heisel et al. | Aug. 1, 1939 |
| 2,674,620 | Sonia et al. | Apr. 6, 1954 |

FOREIGN PATENTS

| | | |
|---|---|---|
| 860,355 | Germany | Dec. 22, 1952 |
| 1,003,204 | Germany | Feb. 28, 1957 |